(12) United States Patent
Odani et al.

(10) Patent No.: US 7,029,503 B2
(45) Date of Patent: Apr. 18, 2006

(54) DISAZO COMPOUND, REACTIVE DYE COMPOSITION, AND METHOD OF DYEING CELLULOSE OR CELLULOSE-CONTAINING FIBERS

(75) Inventors: Junji Odani, Kounosu (JP); Eiichi Ogawa, Kitakatsushika-gun (JP); Yasuo Shirasaki, Saitama (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/476,471

(22) PCT Filed: May 8, 2002

(86) PCT No.: PCT/JP02/04483

§ 371 (c)(1),
(2), (4) Date: Dec. 24, 2003

(87) PCT Pub. No.: WO02/092698

PCT Pub. Date: Nov. 21, 2002

(65) Prior Publication Data

US 2004/0117924 A1  Jun. 24, 2004

(30) Foreign Application Priority Data

May 11, 2001 (JP) ............................. 2001-141163
Nov. 30, 2001 (JP) ............................. 2001-366096

(51) Int. Cl.
*C09B 62/09* (2006.01)
*C09B 62/085* (2006.01)
*C09B 67/22* (2006.01)
*D06P 3/82* (2006.01)
*D06P 3/66* (2006.01)

(52) U.S. Cl. ........................ 8/549; 8/547; 8/641; 8/918; 534/604; 534/605; 534/612; 534/614; 534/617

(58) Field of Classification Search ................ 534/604, 534/605, 612, 614, 617; 8/543, 547, 641, 8/918
See application file for complete search history.

(56) References Cited

U.S. PATENT DOCUMENTS 4,453,945 A   6/1984 Miyamoto et al. ............. 8/543
4,861,344 A * 8/1989 Schlafer et al. ................ 8/532

FOREIGN PATENT DOCUMENTS

| GB | 2 036 780 | 11/1978 |
| JP | 60-90264 | 5/1985 |
| JP | 62-250059 | 10/1987 |
| JP | 1-308460 | 12/1989 |
| JP | 3-7769 | 1/1991 |

OTHER PUBLICATIONS

Copy of the International Search Report dated Aug. 27, 2002.

* cited by examiner

*Primary Examiner*—Margaret Einsmann
(74) *Attorney, Agent, or Firm*—Nields & Lemack

(57) ABSTRACT

The present invention provides a disazo compound which in a free acid form is represented by the formula (1) and which has high ability to dye cellulosic fibers and attains efficient dyeing with satisfactory reproducibility; and a method of dyeing cellulosic fibers with the compound. Also provided are: a reactive dye composition comprising a compound represented by the formula (1) and a specific red reactive dye and/or a specific blue reactive dye; and a method of dyeing cellulosic fibers with the composition.

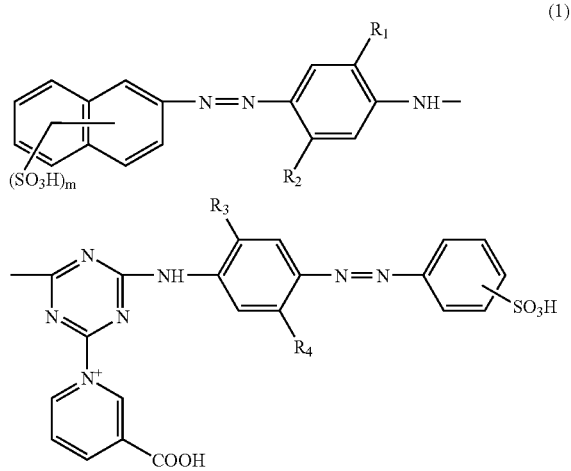

(1)

In the formula, $R_1$ and $R_3$ each represents hydrogen atom or methoxy group; $R_2$ and $R_4$ each represents hydrogen atom, methyl group, acetylamino group, ureido group, etc.; and m is 2 or 3.

8 Claims, No Drawings

DISAZO COMPOUND, REACTIVE DYE COMPOSITION, AND METHOD OF DYEING CELLULOSE OR CELLULOSE-CONTAINING FIBERS

FIELD OF THE INVENTION

The present invention relates to a disazo compound as a reactive dye and a method of dyeing cellulosic fibers using this compound. Further, the present invention relates to a reactive dye composition and a dyeing method for dyeing cellulose or cellulose-containing fibers using a reactive dye.

BACKGROUND OF THE INVENTION

Various reactive dyes have been known. They have been widely used for dyeing cellulosic fibers. The reactive dyes have reactive groups such as monochloro-triazinyl, monofluoro-triazinyl, fluoro-chloro-pyrimidinyl, dichloro-quinoxazinyl, vinylsulfonyl, sulfato-ethylsulfonyl and the like. For dyeing, the reactive dye is used in the presence of an acid binder such as sodium carbonate, sodium hydroxide, sodium metasilicate and the like in a dyeing bath having a pH of 10 or higher and a temperature of 100° C. or less. The acid binder is often added stepwise during a dyeing step in order to avoid problems such as unlevel dyeing, lowering in color yield due to hydrolysis and the like.

On the other hand, cellulose-containing blended fibers, especially blended cotton/polyester fibers are commercially employed in large quantities since they give comfortable clothes.

A disperse dye used for dyeing polyester fibers is generally used in a dye bath having an acid to neutral pH and a temperature of about 100 to 140° C. in order to avoid its decomposition and alteration. These dyeing conditions of a disperse dye do not agree with those of a reactive dye. Therefore, when blended fibers are dyed, a two bath method wherein respective fibers are independently treated in respective dye bath and an one bath/two step method wherein both fibers are successively treated in one dye bath while sliding dying conditions for each fibers.

For purposes of reducing a dyeing time, saving energy, simplifying dyeing operations and the like, a reasonable dyeing method wherein there is no need for controlling a delicate and complicated addition of an agent during a dyeing step has been desired. And, in the dyeing of blended polyester/cotton fibers, an efficient one bath/one step dyeing method wherein both fibers are dyed simultaneously in one dye bath is desired. This one bath/one step dyeing method is sometime referred to as "one bath dyeing method". A reactive dye used in this method should have a stability without causing a decomposition and a high dyeing property under conditions of dyeing polyester fibers with a disperse dye, that is, in a dye bath having an acidic to neutral pH and a temperature of 100 to 140° C.

Some reactive dyes having the above properties have been proposed. Yellow reactive dyes relating to the present invention can be exemplified in, for example, JP-A-60-086168 (1985), JP-A-01-308460 (1989) and the like. However, the dyes described in these patents have not always satisfactory properties. For example, the dyes do not show sufficient dyeing property over a relatively low temperature range around 100° C. and therefore a high color yield is not attained. Problems such as color breakup and unlevel dyeing upon dyeing using a mixed dye comprising a reactive dye and other dye are observed so that a formulation compatibility, a reproducibility and the like are not still satisfactory. Thus, the development of a yellow reactive dye which always shows a high dyeing property, has a good reproducibility and excellent fastnesses in various aspects such as a fastness to light, a fastness to chlorinated water, a fastness to washing and the like, and does not invite problems such as thermal discoloration, phototropy and the like is strongly desired.

In addition, in a mixed dye comprising a yellow reactive dye together with a red reactive dye and/or a blue reactive dye, reactive dyes having a reactive groups such as carboxypyridinio-triazinyl group, for example C.I. Reactive Yellow 162, 163, 178; C.I. Reactive Red 221; C.I. Reactive Blue 216, 217; and the like have been used.

When a mixed dye comprising the above known reactive dye is used for dyeing, however, many problems such as a poor dyeing reproducibility and an unlevel dyeing property caused by the difference in dyeing property of dyes to be mixed, a color transfer (migration) during a drying step caused by a poor washing of a non-fixed dye, and the like are found.

Thus, in a mixed dye comprising a yellow reactive dye together with a red reactive dye and/or a blue reactive dye, the development of a reactive dye composition which shows negligible change in hue with the change of dyeing conditions including an inorganic salt concentration, a bath ratio, a pH of a dye bath, a dyeing temperature, a dyeing period and the like over a wide temperature range from 90 to 140° C., excellent dyeing reproducibility and excellent washing property of a non-fixed dye and without causing problems such as a color transfer of a non-fixed dye during a drying step and the like is desired. Further, the development of a reactive dye composition having excellent formulation compatibility brought about by harmonizing a dyeing property of each dye component and the development of a method of dyeing cellulose fibers or cellulose-containing fibers are strongly desired.

SUMMARY OF THE INVENTION

Under the above circumstances, the present inventors zealously researched in order to develop a yellow reactive dye having high dyeing property and excellent dyeing reproducibility in a dye bath having an acidic to neutral pH and a wide temperature range. As a result, they found a disazo compound having desired properties.

Further, they found a reasonable dyeing technique by which cellulose or cellulose-containing fibers can be dyed with good reproducibility and without inviting a trouble caused by a insufficient washing of a non-fixed dye and the like, by using the above disazo compound together with a specific red reactive dye and/or a specific blue reactive dye so that a dyeing property of each dye component can be harmonized.

Accordingly, the present invention relates to:

(1) a disazo compound which in a free acid form is represented by the following general formula (1):

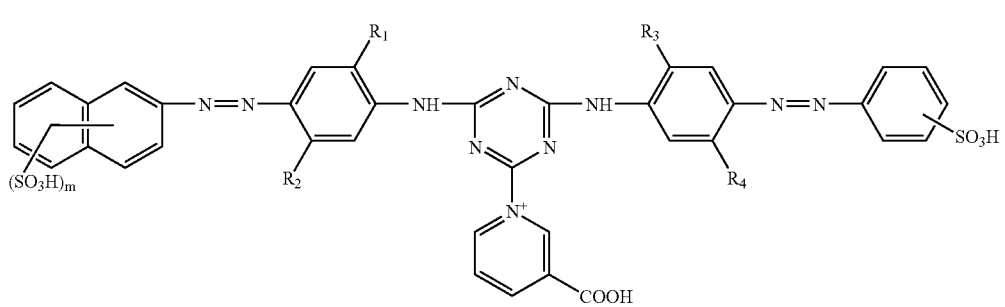

wherein $R_1$ is hydrogen atom or methoxy group; $R_2$ is hydrogen atom, methyl group, methoxy group, acetylamino group or ureido group; $R_3$ is hydrogen atom or methoxy group; $R_4$ is hydrogen atom, methyl group, acetylamino group or ureido group; and m is 2 or 3;

(2) a method of dyeing cellulosic fibers comprising using the disazo compound as described in the above (1);

(3) a reactive dye composition comprising (A) a yellow reactive dye which comprises at least one compound selected from the group consisting of compounds which in free acid forms are represented by the general formula (1) as described in the above (1), together with (B) a red reactive dye which comprises at least one compound selected from the group consisting of azo compounds which in free acid forms are represented by the following general formula (2):

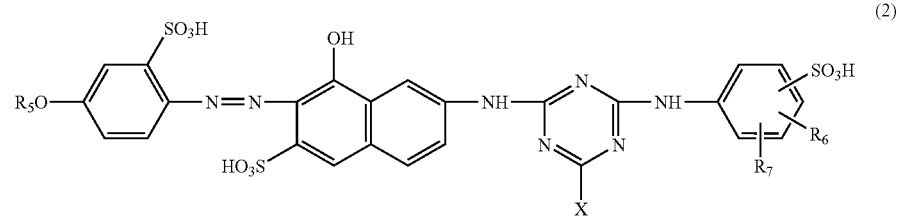

wherein $R_5$ is $CH_3$ or $C_2H_5$; $R_6$ and $R_7$ are independently H, Cl or $CH_3$; and X is

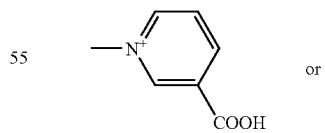 or

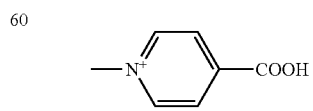

and azo compounds which in free acid forms are represented by the following general formula (3):

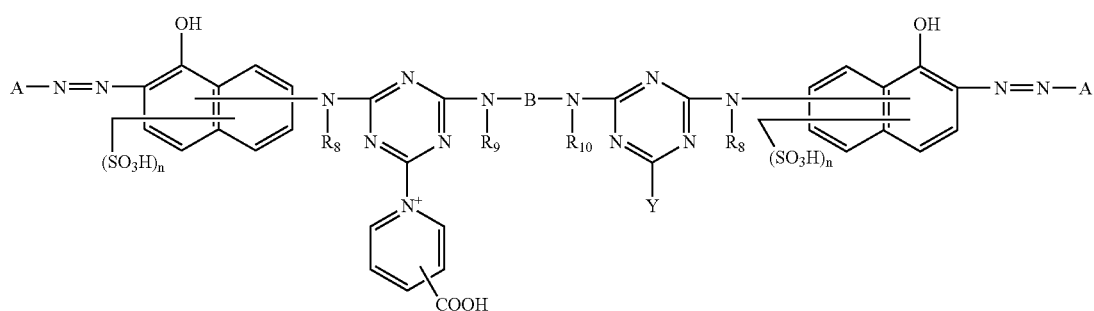

wherein A is a benzene nucleus having 1 to 2 sulfonic acid group or carboxyl group and optionally methyl group, methoxy group or chlorine atom, or a naphthalene nucleus having 1 to 3 sulfonic acid groups; $R_8$, $R_9$ and $R_{10}$ are independently hydrogen atom or methyl group; n is 1 or 2; Y is

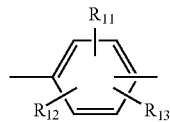

or chlorine atom; and B is —$(CH_2)_p$— in which p is 2 or 3, —$C_2H_4OC_2H_4$—, —$CH_2CH(OH)CH_2$—,

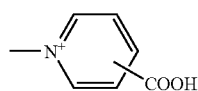

in which $R_{11}$, $R_{12}$ and $R_{13}$ are independently hydrogen atom, methyl group, sulfonic acid group or carboxyl group, provided that this formula does not represent

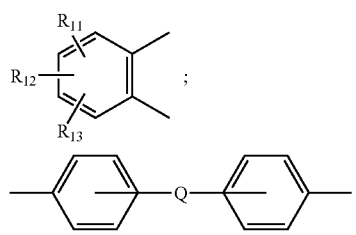

in which Q is O, $SO_2$, NHCO or NH,

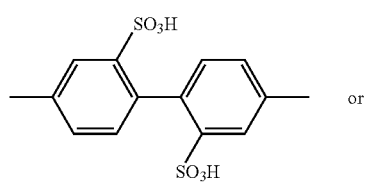

or

-continued

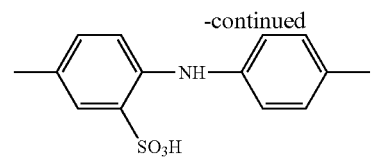

and/or
(C) a blue reactive dye which comprises at least one compound selected from the group consisting of formazane compounds which in free acid forms are represented by the following general formula (4):

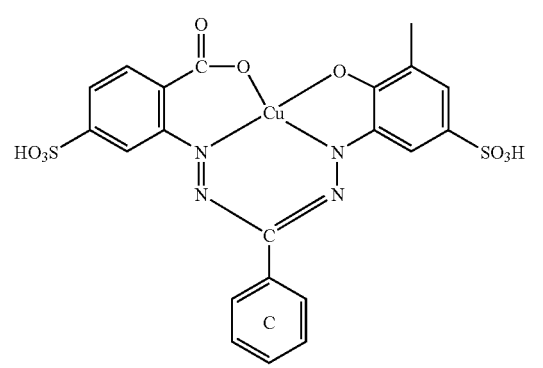

wherein D is a group of a formazane compound represented by the following general formula (5):

in which the benzene nucleus c may have sulfonic acid group or chlorine atom; t is 0 or 1; when t is 0, $R_{16}$ is hydrogen atom, E is the above-defined D or phenyl group substituted with methyl, methoxy, sulfonic acid group or chlorine and when t is 1, $R_{14}$ and $R_{15}$ each is hydrogen atom or methyl group; G is —$C_2H_4$—, —$C_2H_4OC_2H_4$—, phenylene group optionally substituted with methyl, sulfonic acid group, carboxyl or chlorine,

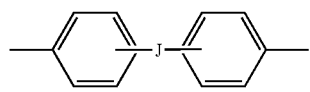

in which J is O, $SO_2$, NH and NHCO,

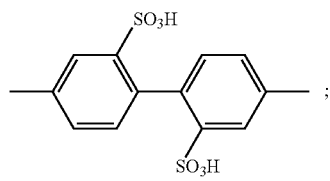

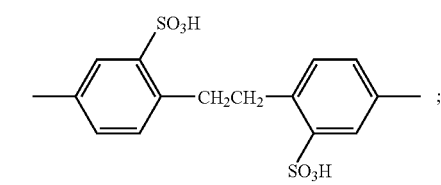

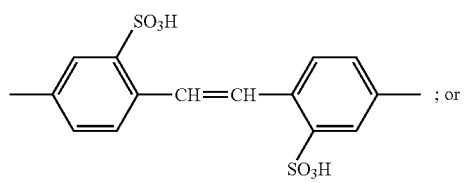

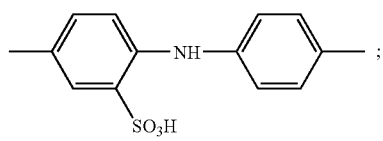

Z is chlorine atom or

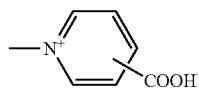

in which carboxyl group is bonded to 3 or 4 position; E is the above-defined D; $C_{1-2}$ alkyl group; or phenyl group optionally substituted with methoxy, sulfonic acid group or carboxyl, $R_{16}$ is hydrogen atom and alternatively $R_{16}$ together with E form

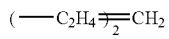

provided that when E is D, $R_{16}$ is hydrogen atom and when G is

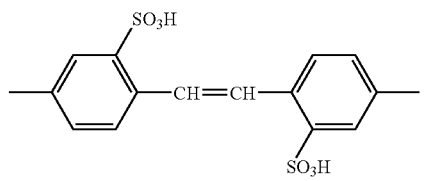

E is not D, and disazo compounds which in free acid forms are represented by the following general formula (6):

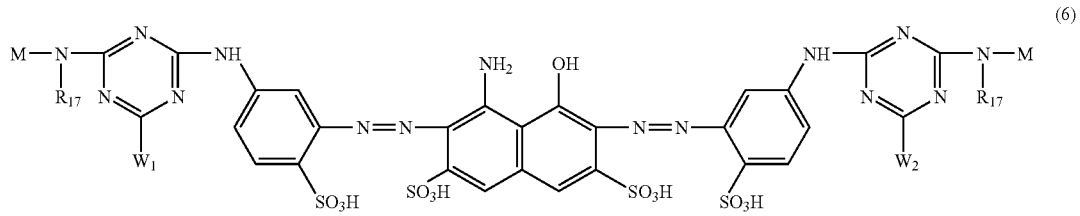

wherein M is phenyl group optionally substituted with sulfonic acid group, carboxyl, methyl, methoxy or chlorine, naphthyl group substituted with 1 to 3 sulfonic acid group, $C_{1-3}$ alkyl group optionally substituted with carboxyl or sulfonic acid group or hydrogen atom; $R_{17}$ is hydrogen atom or methyl group; $W_1$ and $W_2$ are independently chlorine atom or

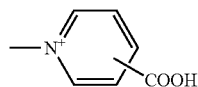

in which carboxyl group is bonded to 3 or 4 position, provided that at least one of $W_1$ and $W_2$ is

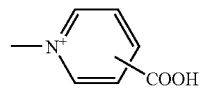

in which carboxyl group is bonded to 3 or 4 position;

(4) a reactive dye composition as described in the above (3) which contains the red reactive dye (B) comprising a compound represented by the following formulae (7) and/or (8):

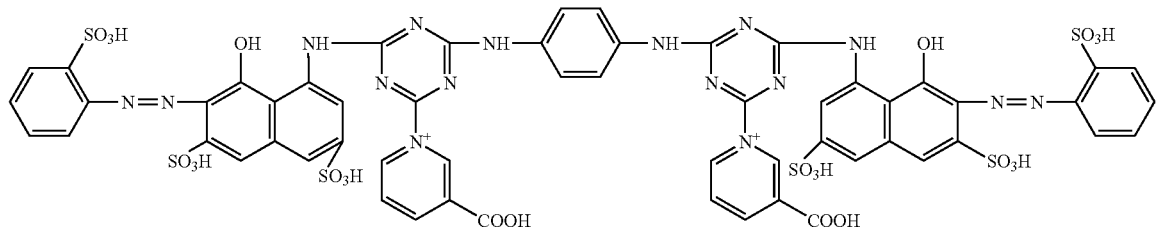

(7)

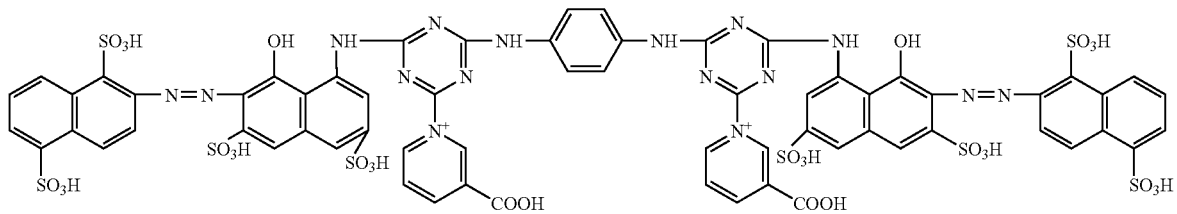

(8)

and a mixture of the blue reactive dye (C) comprising compounds represented by the following formulae (9) and (10):

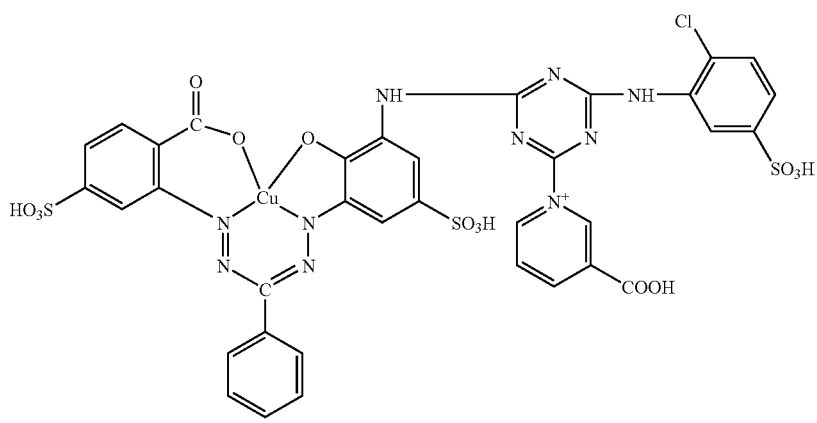

(9)

-continued

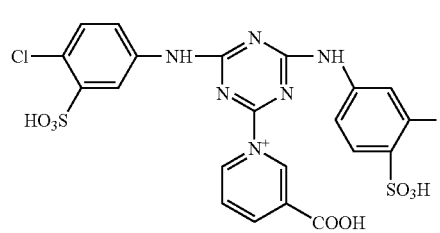
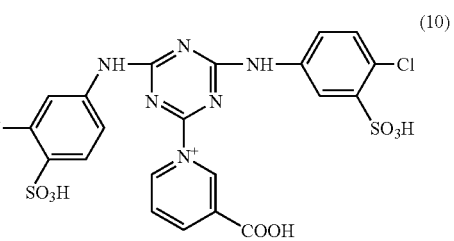

(10)

(5) a reactive dye composition as described in the above (4) wherein the yellow reactive dye (A) comprises a compound represented by the formula (11):

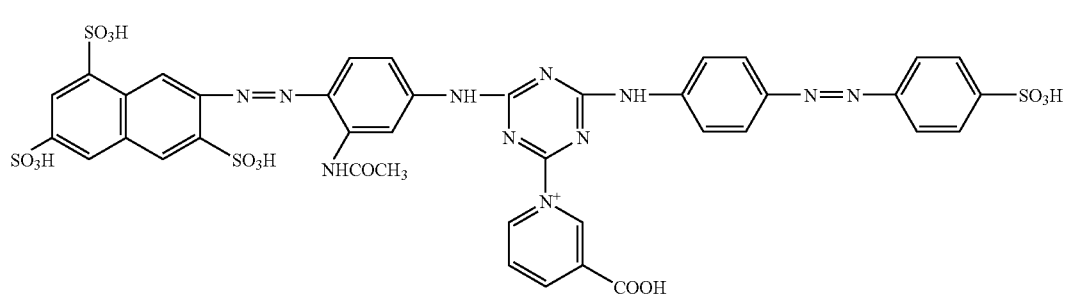

(11)

and the mixing ratio of the compounds represented by the above formulae (9) and (10) in the blue reactive dye (C) is 50 to 70:50 to 30;

(6) a method of dyeing cellulose or cellulose-containing fibers comprising using the reactive dye composition described in the above (3), (4) or (5);

(7) a method of dyeing cellulose or cellulose-containing fibers comprising using the yellow reactive dye (A) together with the red reactive dye (B) and/or the blue reactive dye (C) as described in the above (3), (4) or (5);

(8) a method of dyeing cellulose or cellulose-containing fibers as described in the above (6) or (7) wherein a pH of a dye bath is 5 to 9 and a dyeing temperature is 90 to 140° C.; and (9) a method of dyeing cellulose or cellulose-containing fibers as described in the above claim (8) wherein the dyeing temperature is 95 to 110° C.

DETAILED DESCRIPTION OF THE INVENTION

The present invention will be described in more detail.

The disazo compound of the present invention is represented by the above formula (1) in a free acid form. For example, this compound is synthesized by the following method.

A compound which in a free acid form is represented by the general formula (12):

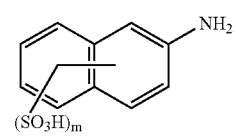

(12)

wherein m is as defined above, is diazotized. The thus-diazotized compound is coupled with a compound represented by the general formula (13):

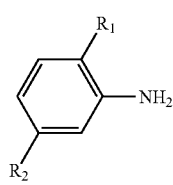

(13)

wherein $R_1$ and $R_2$ are as defined above, to obtain a compound which in a free acid form is represented by the general formula (14):

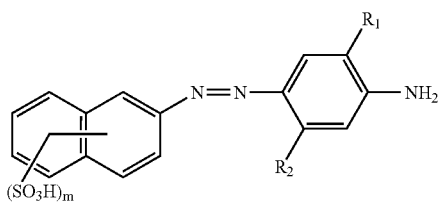
(14)

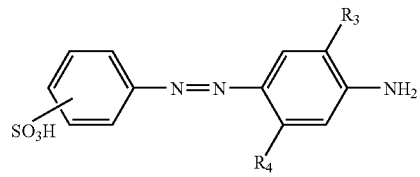
(17)

wherein $R_1$, $R_2$ and m are as defined above. The diazotization is conducted according to a conventional method using hydrochloric acid and sodium nitrite at a temperature of 0 to 20° C. The coupling is conducted at a temperature of 0 to 30° C. and a pH of 3 to 8. After the reaction, the reaction product is generally salted out with sodium chloride or the like, filtered and isolated.

On the other hand, a compound which in a free acid form is represented by the general formula (15):

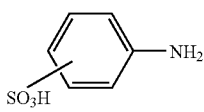
(15)

is diazotized. The thus-diazotized compound is coupled with a compound represented by the general formula (16):

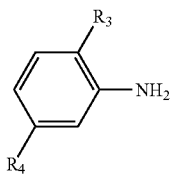
(16)

wherein $R_3$ and $R_4$ are as defined above, to obtain a compound which in a free acid form is represented by the general formula (17):

wherein $R_3$ and $R_4$ are as defined above. The diazotization is conducted according to a conventional method using hydrochloric acid and sodium nitrite at a temperature of 0 to 20° C. The coupling is conducted at a temperature of 0 to 30° C. and a pH of 3 to 8.

Then, the compound of the formula (14) or (17) and cyanuric chloride are condensed in any order to obtain a compound which in a free acid form is represented by the general formula (18):

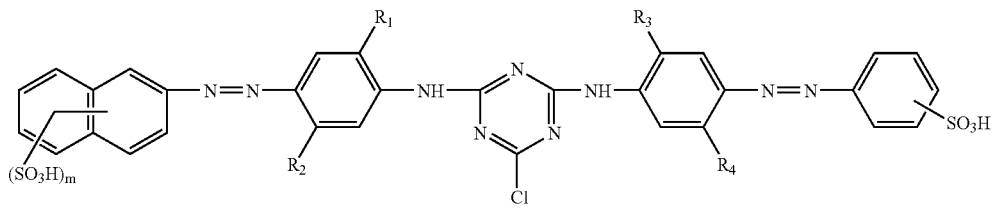
(18)

wherein $R_1$, $R_2$, $R_3$, $R_4$ and m are as defined above. The first condensation in the above reaction is conducted in water at a temperature of 0 to 30° C. and a pH of 2 to 8 and the second condensation is conducted at a temperature of 30 to 70° C. and a pH of 3 to 8. Then, the resultant compound of the above formula (18) is reacted with nicotinic acid to obtain a disazo compound represented by the above formula (1). This reaction is conducted in water at a temperature of 80 to 100° C. and a pH of 4 to 7.

The form of the disazo compound of the above formula (1) of the present invention may be either its free acid or its salt, or a mixture thereof. Preferably, the disazo compound of the above formula (1) is in the form of its alkali metal salt or its alkaline earth metal salt, especially in the form of Na, K and Li salts thereof. The disazo compound is generally isolated in the form of the above salt by subjecting it to a treatment such as salting out or the like, if necessary.

Example of the compound which in a free acid form is represented by the above formula (12) and which is used in the preparation of the disazo compound of the above formula (1) includes 2-amino-3,6-naphthalene-disulfonic acid, 2-amino-4,9-naphthalene-disulfonic acid, 2-amino-5,7-naphthalene-disulfonic acid, 2-amino-6,8-naphthalene-disulfonic acid and the like (wherein m is 2), and 2-amino-3, 6,8-naphthalene-trisulfonic acid, 2-amino-4,6,8-naphthalene-trisulfonic acid and the like (wherein m is 3).

Example of the compound of the above formula (13) includes aniline, 2-methoxyaniline, 3-methylaniline, 3-methoxyaniline, 3-acetylaminoaniline, 3-ureidoaniline, 2,5-dimethoxyaniline, 2-methoxy-5-methylaniline, 2-methoxy-5-acetylaminoaniline and the like.

On the other hand, example of the compound which in a free acid form is represented by the above formula (15) includes 2-aminobenzenesulfonic acid, 3-aminobenzenesulfonic acid, 4-aminobenzenesulfonic acid and the like.

Example of the compound of the formula (16) includes aniline, 2-methoxyaniline, 3-methylaniline, 3-acetylaminoaniline, 3-ureidoaniline, 2-methoxy-5-methylaniline, 2-methoxy-5-acetylaminoaniline and the like.

Next, the reactive dye composition of the present invention will be described below.

The reactive dye composition of the present invention can be obtained by formulating (A) a yellow reactive dye with (B) a red reactive dye and/or (C) a blue reactive dye.

The reactive dye composition of the present invention comprises as a yellow reactive dye at least one compound selected from the group consisting of compounds represented by the above general formula (1).

Example of the compound represented by the above general formula (1) is shown in Table 1.

TABLE 1

| positions of SO$_3$H group on naphthalene ring | R$_1$ | R$_2$ | position of SO$_3$H group on benzene ring | R$_3$ | R$_4$ |
|---|---|---|---|---|---|
| 4, 8 | H | NHCOCH$_3$ | 3 | OCH$_3$ | H |
| 4, 8 | H | NHCONH$_2$ | 4 | H | H |
| 6, 8 | H | NHCOCH$_3$ | 4 | H | H |
| 3, 6, 8 | H | OCH$_3$ | 3 | OCH$_3$ | H |
| 3, 6, 8 | H | NHCONH$_2$ | 4 | H | H |
| 4, 6, 8 | H | NHCOCH$_3$ | 4 | H | H |
| 4, 6, 8 | H | CH$_3$ | 3 | H | CH$_3$ |

Among the disazo compounds represented by the general formula (1) contained as a yellow reactive dye in the reactive dye composition of the present invention, a compound represented by the formula (11) is preferable. Any other yellow reactive dye having similar reactive groups such as C.I. Reactive Yellow 162, 163, 178 and the like may be used as a yellow reactive dye, in addition to the disazo compound represented by the above formula (1).

The form of the disazo compound of the above formula (1) may be either its free acid or its salt, or a mixture thereof. Preferably, the disazo compound of the formula (1) is in the form of its alkali metal salt or its alkaline earth metal salt, especially in the form of Na, K and Li salts thereof. The disazo compound is generally isolated in the form of the above salt by subjecting it to a treatment such as salting out or the like, if necessary.

A red reactive dye capable of being contained in the reactive dye composition of the present invention comprises at least one compound selected from the group consisting of compounds represented by the general formula (2) and compounds represented by the general formula (3). Compounds represented by the general formulae (7) and/or (8) are preferable. Further, a red reactive dye may comprise a mixture of a compound represented by the general formula (2) and a compound represented by the general formula (3). Among the compounds represented by the general formula (2), a compound which in a free acid form is represented by the following formula (19) is preferable.

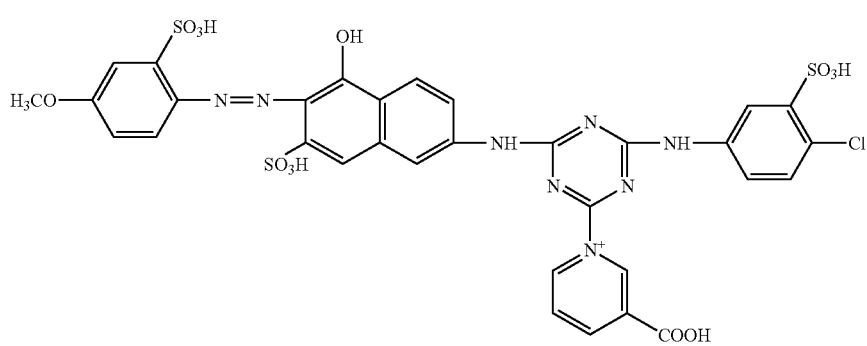

(19)

A mixing ratio of a compound represented by the general formula (3) and a compound represented by the formula (19) is generally 50 to 100:50 to 0, preferably 70 to 100:30 to 0. Similar to the case of yellow reactive dye, any other red reactive dye having similar reactive groups may be used as a red reactive dye, in addition to the compounds represented by the general formulae (2) and (3).

A blue reactive dye capable of being contained in the reactive dye composition of the present invention comprises at least one compound selected from the group consisting of compounds represented by the general formula (4) and compounds represented by the general formula (6). A mixture of a compound represented by the above formula (9) and a compound represented by the above formula (10) is preferable. The mixture comprising a compound represented by the formula (9) and a compound represented by the formula (10) in a mixing ratio of 50 to 70:50 to 30 is more preferable. Similar to the cases of yellow reactive dye and red reactive dye, any other blue reactive dye having similar reactive groups may be used as a blue reactive dye, in addition to the compounds represented by the general formulae (4) and (6).

The above compounds of the above formulae (2), (3), (4) and (6) can be synthesized by known methods, for example the methods described in JP-A-60-086169(1985), JP-A-60-090264 (1985), JP-A-60-090265 (1985) and the like. The form of each of these compounds may be either its free acid or its salt, or a mixture thereof. Preferably, the above compounds are in the form of their alkali metal salts or their alkaline earth metal salts, especially in the form of Na, K and Li salts thereof. These compounds are generally isolated in the form of their salts by subjecting them to a treatment such as salting out or the like, if necessary.

In the reactive dye composition of the present invention, dyes may be formulated by any method of formulation. For example, a method comprising independently preparing respective dye and then blending the dyes; a method comprising blending dyes in the form of reaction liquids immediately after their preparation and drying to make a composition; a method comprising dissolving respective dye upon dyeing to make a composition under solution; a method comprising dissolving respective dye in a dye bath to make a composition in the dye bath can be employed. A mixing ratio of a yellow reactive dye (A) with a red reactive dye (B) and/or a blue reactive dye (C) is not particularly limited. Generally it is selected depending on desired color tone. For example, a mixing ratio of a yellow reactive dye (A), a red reactive dye (B) and a blue reactive dye (C) to obtain a brown color tone, a gray color tone and a dark green color tone easily giving rise to problems as to a dyeing reproducibility and the like is preferably selected as follows:

(brown color tone)

(A):(B):(C)=40 to 80:10 to 40:5 to 40

(gray color tone)

(A):(B):(C)=10 to 40:10 to 20:50 to 80

(dark green color tone)

(A):(B):(C)=30 to 60:0 to 10:40 to 70

If necessary, the reactive dye composition of the present invention contains known additives such as a concentration controlling agent (anhydrous sodium sulfate and the like), a dispersing agent (Demol N, trade name of Kao Corporation, a Tamol-type dispersing agent; Vanilex RN, trade name of Kao Corporation, a lignin-type dispersing agent, and the like), an anti-reducing agent (Polymin L New, trade name of Nippon Kayaku Co., Ltd., an anti-reduction agent; MS powder, trade name of Meisei Chemical Works, Ltd., an anti-reduction agent, and the like).

The disazo compound of the above formula (1) and the reactive dye composition according to the present invention can be applied for dyeing cellulosic fibers by a method such as a dip dyeing method, a continuous dyeing method by padding according to the conventional method and a printing method. If the dying method of the present invention is a dip dyeing method, a bath ratio is generally 1:5 to 1:50. In the dyeing method of the present invention, the dyeing method per se can be conducted according to a known method.

A fiber material capable of being dyed by the dyeing method of the present invention includes cotton, hemp, rayon, polynosic, cupra, lyocell fibers and the like, their mutual mixtures, their blended fibers with other fibers such as polyester fibers, acetate fibers, polyacrylonitrile fibers, wool, silk, polyamide fibers such as nylon and the like, and cowoven fabrics thereof.

The disazo compound and the reactive dye composition according to the present invention are very useful since they have always high dyeing property under the condition of a bath pH of 5 to 9 and a temperature of generally 90 to 140° C., more preferably 95 to 135° C. and therefore they can dye blended fibers containing cellulosic fibers, especially blended polyester/cotton fibers in the co-existence of a disperse dye by a reasonable one bath/one step dyeing method.

For example, the dyeing of blended polyester/cotton fibers in a one bath/one step dyeing method is conducted as follows:

The disazo compound or the reactive dye composition of the present invention and a disperse dye(s) are formulated depending on desired hue and concentration. Additionally, a pH controlling agent for keeping a dye bath at a pH of 5 to 9, preferably 6 to 8 [for example, 0.1 to 5 g/L of Kayaku Buffer P-7 (trade name of Nippon Kayaku Co., Ltd.)], an inorganic salt [for example, 5 to 80 g/L of anhydrous sodium sulfate] and if necessary, a dispersing and leveling agent [for example, 0.1 to 5 g/L of KP leveller RP (trade name of Nippon Kayaku Co., Ltd.)] are added to prepare a dye bath with a bath ratio of 1:5 to 1:50. After a fabric to be dyed is introduced in the dye bath, for example, the temperature of the dye bath is increased to 120 to 140° C. over 20 to 40 minutes and the dyeing is conducted at the same temperature for 20 to 60 minutes. After the dyeing step is finished, the resultant dyed fabric is washed with water and/or hot water and then soaped in a soaping bath containing 0.1 to 5 g/L of a commercially available soaping agent to complete the dyeing.

Further, the disazo compound and the reactive dye composition according to the present invention have excellent property that they show high dyeing property at a relatively low temperature around 100° C. Therefore, the disazo compound and the reactive dye composition of the present invention can dye polyacrylonitrile fibers which are generally dyed with a basic dye at about 100° C. in a dye bath having an acidic to neutral pH, or wool, silk and blended fabrics comprising cellulose fibers and polyamide fibers (for example, nylon and the like) which are dyed with an acid dye. The blended fibers can be dyed in one bath dyeing method using the above compound or composition.

For example, the one bath dyeing of blended nylon/cotton fibers is conducted as follows:

The disazo compound or the reactive dye composition of the present invention and an acid dye(s) are formulated depending on desired hue and concentration. Additionally, a pH controlling agent for keeping a dye bath at a pH of 5 to 9, preferably 6 to 8 [for example, 0.1 to 5 g/L of Kayaku Buffer P-7 (trade name of Nippon Kayaku Co., Ltd.)], an inorganic salt [for example, 5 to 40 g/L of anhydrous sodium sulfate] and if necessary, an anti-contamination agent for nylon [for example, 0.1 to 5 g/L of Sunresist NR-100L (trade name of Nikka Chemical Co., Ltd.)] are added to prepare a dye bath with a bath ratio of 1:5 to 1:50. After a fabric to be dyed is introduced in the dye bath, for example, a temperature of the dye bath is increased to 90 to 110° C., preferably 95 to 110° C. over 20 to 60 minutes and the dyeing is conducted at the same temperature for 20 to 60 minutes. If necessary, 0 to 40 g/L of anhydrous sodium sulfate is further added during a dyeing step. After the dyeing step is finished, the resultant dyed fabric is washed with water and/or hot water and then soaped in a soaping bath containing 0.1 to 5 g/L of a commercially available soaping agent to complete the dyeing.

A fiber material capable of being dyed with the disazo compound or the reactive dye composition of the present invention is not limited to the materials mentioned above. A fiber material essentially consisting of cellulosic fibers can be dyed in the same way as that described above.

Upon dyeing, the conventional method comprising treating a fiber material in a dye bath at a temperature of generally 40 to 100° C., adding an acid binder in the dye bath and then dyeing can be employed. Alternatively, the so-called all-in-one dyeing method comprising previously adding to a dye bath an acid binder or a buffer in an amount for keeping the dye bath at a pH of 5 to 9 and then dyeing can be employed.

For example, when cellulosic fibers such as cotton and the like are dyed, a dye bath is first prepared by mixing the disazo compound or the reactive dye composition of the present invention in an amount which is varied depending on desired hue and concentration, a pH controlling agent for keeping the dye bath at a pH of 5 to 9, preferably 6 to 8 [for example, 0.1 to 5 g/l of Kayaku Buffer P-7 (trade name of Nippon Kayaku Co., Ltd., a pH controlling agent)] and an inorganic acid, [for example, 5 to 100 g/L of anhydrous sodium sulfate] in a bath ratio of 1:5 to 1:50. After a material to be dyed is introduced in the dye bath, for example a temperature of the dye bath is increased to generally 90 to 120° C., suitably 95 to 110° C. over 20 to 40 minutes and the dyeing is conducted at the same temperature for 20 to 60 minutes. As the pH controlling agent used in the dyeing of cellulosic fibers, a pH sliding agent by which a pH is varied with time due to the change in temperature and the like during a dyeing step, for example 0.1 to 5 g/L of Kayaslide PH-509 or Kayaslide PH-608 (Kayaslide is a trade name of Nippon Kayaku Co., Ltd., a pH controlling or sliding agent), can be used. After the dyeing step is finished, the resultant dyed material is washed with water and/or hot water and then soaped in a soaping bath containing 0.1 to 5 g/L of a commercially available soaping agent to complete the dyeing.

The disazo compound and the reactive dye composition of the present invention has high dyeing property even at a low temperature range around 100° C., shows a small change in hue even if dyeing conditions are varied, dyes with excellent dyeing reproducibility and washes off a non-fixed dye satisfactorily. Accordingly, they can dye a fiber material without inviting the problem of a color transfer of a non-fixed dye to the fabric material during a drying step. Further, the disazo compound and the reactive dye composition of the present invention are very excellent in solid dyeing of blended fibers comprising a mutual mixture of cellulosic fibers, for example blended cotton/rayon fibers.

By using the disazo compound and the reactive dye composition of the present invention, problems caused by a delicate and complicated addition of an acid binder during a dyeing step such as a lowering in color yield due to hydrolysis, an unlevel dyeing, a color breakup upon dyeing using a mixed dye and the like can be resolved. Simultaneously, the dyeing can be conducted with improved efficiency and high reproducibility.

Upon dyeing, the disazo compound of the present invention can be used singly or in mixture. If desired, the disazo compound of the present invention can be used in combination with a reactive dye other than the disazo compound of the present invention, a disperse dye and/or an acid dye.

An acid binder and a pH controlling agent (sometimes referred to as "a buffer") usable in the dyeing method of the present invention are not especially limited. Example of an acid binder includes sodium carbonate, potassium carbonate, sodium hydroxide, potassium hydroxide, sodium metasilicate, trisodium phosphate, tripotassium phosphate, sodium pyrophosphate, potassium pyrophosphate, sodium trichloroacetate and the like. Example of a pH controlling agent includes commercially available pH controlling agents, acetic acid+sodium acetate, monosodium phosphate+disodium phosphate, monopotassium phosphate+disodium phosphate, maleicacid+borax, boric acid+borax, and the like. They can be used singly or in a suitable mixture, if necessary.

If necessary during a dyeing step, known dyeing auxiliaries such as a dispersing agent (Demol N, Vanilex RN and KP Leveller RP, trade names of Nippon Kayaku Co., Ltd., a dispersing and leveling agent for disperse dyes), a leveling agent (Newbon TS, trade name of Nikka Chemical Co., Ltd., a leveling agent for specific anionic nylon; Miguregal AM, trade name of Nikka Chemical Co., Ltd., a leveling agent for disperse dyes), a carrier agent (Carrier 430, trade name of Nikka Chemical Co., Ltd., a carrier agent, and the like), a metal sequestrant (Kayachelator N-1, trade name of Nippon Kayaku Co., Ltd., a neutral metal sequestrant, and the like), an anti-reduction agent (Polymin L-New, Miss. powder and the like) and the like can be used.

The disazo compound represented by the above formula (1) and the reactive dye composition of the present invention have always high dyeing property as a reactive dye over a wide temperature range in the presence of a buffering agent capable of keeping a dye bath at a pH of 5 to 9. Therefore, they can dye cellulosic fibers with high color yield and excellent properties including build-up property, levelness and reproducibility. Owing to these properties, the disazo compound and the reactive dye composition of the present invention are very effective for dyeing blended fibers containing cellulosic fibers, especially blended polyester/cotton fibers in the co-existence of a disperse dye by a reasonable one bath/one step dyeing method. Of course, a material to be dyed is not limited to the above-mentioned materials. The disazo compound and the reactive dye composition of the present invention can also dye cellulosic fibers such as cotton, hemp, rayon, polynosic, cupra, lyocell fibers or the like and their mixture with excellent fastnesses in various aspects such as a fastness to light, a fastness to chlorinated water, a fastness to washing and the like and without inviting any problem such as thermal discoloration, phototrophy and the like.

EXAMPLES

The present invention will be described in further detail by referring to the following examples. All parts and percentages referred to herein are by weight unless otherwise indicated.

Example 1

2-Amino-4,8-naphthalene-disulfonic acid was diazotized and coupled with 3-acetylaminoaniline. Then, the thus-coupled product was salted out with sodium chloride and filtered to separate 23.2 parts of 2-(4-amino-2-acetylaminophenylazo)-4,8-naphthalene disulfonic acid. Sodium hydroxide was added thereto and dissolved in 300 parts of water. After 9.3 parts of cyanuric chloride was added, a first condensation was conducted at a temperature of 0 to 5° C. and a pH of 5 to 7. Sodium carbonate was added during the reaction to complete the reaction. Then, a solution of 13.8 parts of 4-(4-aminophenylazo) benzenesulfonic acid in 200 parts of water was added and a second condensation was conducted at a temperature of 50° C. and a pH of 6 to 7. Next, a suspension of 12 parts of nicotinic acid in 100 parts of water was added and then the reaction was continued at a temperature of 95° C. and a pH of 6 to 7 until completion. Thereafter, the reaction was salted out, thereby 41 parts of the disazo compound which in a free acid form is represented by the formula (20) is obtained.

previously sulfomethylated with formalin and sodium hydrogensulfite with diazotized 4-aminobenezenesulfonic acid, hydrolyzing the sulfomethyl group under an alkaline condition, salting out and separating.

Example 2

2-Amino-3,6,8-naphthalene-trisulfonic acid was diazotized and coupled with 3-acetylaminoaniline. Then, the thus-coupled product was salted out with sodium chloride and filtered to separate 27.2 parts of 2-(4-amino-2-acetylaminophenylazo)-3,6,8-naphthalene trisulfonic acid. Sodium hydroxide was added thereto and dissolved in 300 parts of water. After 9.3 parts of cyanuric chloride was added, a first condensation was conducted at a temperature of 0 to 5° C. and a pH of 5 to 7. Sodium carbonate was added during the reaction to complete the reaction. Then, a solution of 13.8 parts of 4-(4-aminophenylazo)-benzenesulfonic acid in 200 parts of water was added and a second condensation was conducted at a temperature of 50° C. and a pH of 6 to 7. Next, a suspension of 12 parts of nicotinic acid in 100 parts of water was added and then there action was continued at a temperature of 95° C. and a pH of 6 to 7 until completion. Thereafter, the reaction was salted out, thereby 44 parts of the disazo compound which in a free acid form is represented by the formula (21) is obtained.

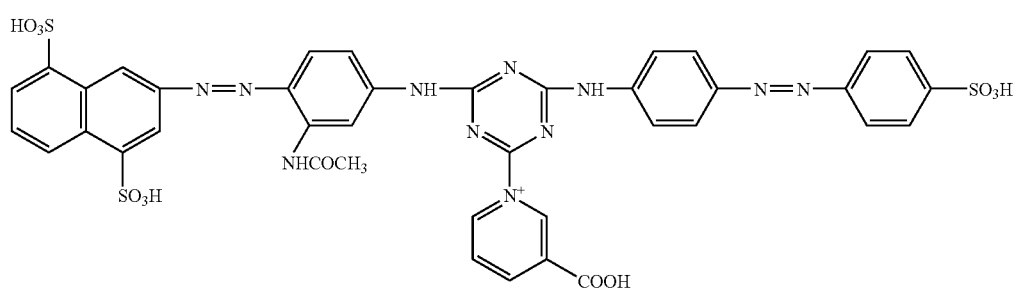

(20)

This compound was dissolved in water very well. The resultant solution had a maximum absorption wavelength of 365 nm.

The compound 4-(4-aminophenylazo)benzenesulfonic acid used in this example was obtained by coupling aniline

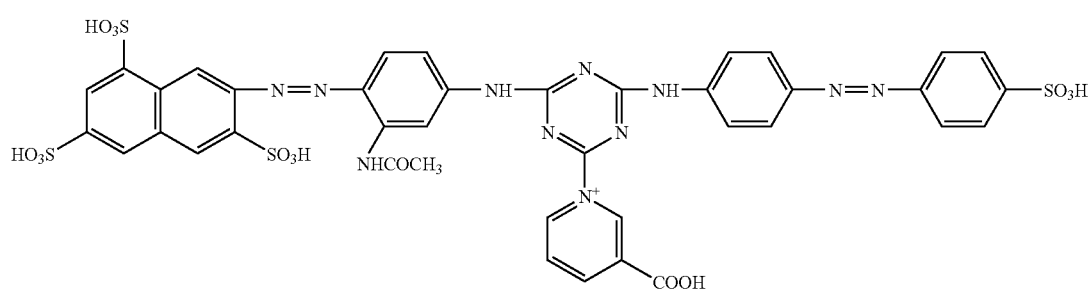

(21)

This compound was dissolved in water very well. The resultant solution had a maximum absorption wavelength of 377 nm.

Examples 3 to 18

Disazo compounds which in free acid forms are represented by the following general formula (22) and having substituents as shown in Table 2 were synthesized in the same way as described in Example 1. Table 2 also shows a maximum absorption wavelength (nm) of a solution of each of the resultant compounds.

TABLE 2

(22)

| Ex. | positions of SO$_3$H group on naphthalene ring | R$_1$ | R$_2$ | position of SO$_3$H group on benzene ring | R$_3$ | R$_4$ | maximum absorption wavelength (nm) |
|---|---|---|---|---|---|---|---|
| 3 | 4, 8 | H | H | 4 | H | H | 355 |
| 4 | 4, 8 | H | NHCOCH$_3$ | 3 | OCH$_3$ | H | 366 |
| 5 | 4, 8 | H | OCH$_3$ | 3 | OCH$_3$ | H | 368 |
| 6 | 4, 8 | H | NHCONH$_2$ | 4 | H | H | 373 |
| 7 | 4, 8 | H | NHCONH$_2$ | 4 | H | NHCONH$_2$ | 375 |
| 8 | 4, 8 | OCH$_3$ | CH$_3$ | 4 | H | NHCOCH$_3$ | 378 |
| 9 | 6, 8 | H | NHCOCH$_3$ | 4 | H | H | 369 |
| 10 | 6, 8 | H | NHCOCH$_3$ | 3 | H | CH$_3$ | 370 |
| 11 | 6, 8 | H | NHCONH$_2$ | 4 | H | NHCONH$_2$ | 376 |
| 12 | 6, 8 | OCH$_3$ | H | 3 | OCH$_3$ | H | 366 |
| 13 | 6, 8 | H | CH$_3$ | 3 | H | CH$_3$ | 368 |
| 14 | 3, 6 | H | NHCOCH$_3$ | 4 | H | H | 367 |
| 15 | 3, 6 | H | NHCONH$_2$ | 3 | H | CH$_3$ | 374 |
| 16 | 3, 6 | H | CH$_3$ | 4 | H | CH$_3$ | 366 |
| 17 | 5, 7 | H | NHCOCH$_3$ | 4 | H | H | 362 |
| 18 | 5, 7 | H | NHCONH$_2$ | 4 | H | NHCOCH$_3$ | 370 |

Examples 19 to 29

Disazo compounds which in free acid forms are represented by the following general formula (23) and having substituents as shown in Table 3 were synthesized in the same way as described in Example 2. Table 3 also shows a maximum absorption wavelength (nm) of a solution of each of the resultant compounds.

TABLE 3

(23)

[Structure: naphthalene-(SO₃H)₃ ring (positions 1-8) connected via N=N to benzene ring with R₁ (position 2) and R₂ (position 5), then NH to triazine ring with pyridinium-COOH substituent, then NH to benzene ring with R₃ (position 2) and R₄ (position 5), then N=N to benzene ring with SO₃H substituent (positions 1-6)]

| Ex. | positions of SO₃H group on naphthalene ring | R₁ | R₂ | position of SO₃H group on benzene ring | R₃ | R₄ | maximum absorption wavelength (nm) |
|---|---|---|---|---|---|---|---|
| 19 | 3, 6, 8 | H | H | 4 | H | H | 371 |
| 20 | 3, 6, 8 | H | NHCOCH₃ | 3 | OCH₃ | H | 379 |
| 21 | 3, 6, 8 | H | OCH₃ | 3 | OCH₃ | H | 381 |
| 22 | 3, 6, 8 | H | NHCONH₂ | 4 | H | H | 384 |
| 23 | 3, 6, 8 | H | NHCONH₂ | 4 | H | NHCONH₂ | 385 |
| 24 | 3, 6, 8 | OCH₃ | CH₃ | 4 | H | NHCOCH₃ | 390 |
| 25 | 4, 6, 8 | H | NHCOCH₃ | 4 | H | H | 371 |
| 26 | 4, 6, 8 | H | NHCOCH₃ | 3 | H | CH₃ | 372 |
| 27 | 4, 6, 8 | H | NHCONH₂ | 4 | H | NHCONH₂ | 379 |
| 28 | 4, 6, 8 | H | CH₃ | 3 | H | CH₃ | 369 |
| 29 | 4, 6, 8 | OCH₃ | H | 4 | H | NHCOCH₃ | 368 |

Example 30

A dye bath was prepared by adding water to 0.5 part of the disazo compound obtained in Example 2, 60 parts of mirabilite, 2 parts of disodium phosphate, 0.5 part of monopotassium phosphate and 1 part of sodium m-nitrobenzene sulfonic acid group such that the total volume was 1000 parts. The pH value of this dye bath was 7. 50 Parts of a knitted cotton fabric was introduced in the dye bath. After the temperature of the dye bath was increased to 130° C. over 30 minutes, the dyeing was conducted at this temperature for 40 minutes. The pH value of the dye bath after dyeing was 7, the same as that before dyeing. Then, the fabric was washed with water, soaped in an aqueous solution containing an anionic surfactant at a temperature of 100° C., washed with water and dried, there by a yellow-dyed fabric was obtained.

The thus-dyed fabric was levelly dyed at a high color yield. It did show neither thermal discoloration nor phototropy. Its fastnesses to light, chlorinated water and washing were good.

Example 31

A dye bath was prepared by adding water to 0.3 part of the disazo compound obtained in Example 1, 0.15 part of Kayacelon Yellow E-3GL (a disperse dye of Nippon Kayaku Co., Ltd.), 0.05 part of Kayacelon Yellow E-BRL conc (a disperse dye of Nippon Kayaku Co., Ltd.), 60 parts of mirabilite, 1 part of sodium m-nitrobenzenesulfonate, 2 parts of a condensate of naphthalenesulfonic acid with formalin (a dispersing agent), 2 parts of disodium phosphate and 0.5 part of monopotassium phosphate such that the total volume was 1000 parts. The pH value of this dye bath was 7. 50 Parts of a fabric comprising blended polyester/cotton (50/50) fibers was introduced in the dye bath. After the temperature of the dye bath was increased to 130° C. over 30 minutes, the dyeing was conducted at this temperature for 60 minutes. Then, the fabric was washed with water, soaped in an aqueous solution containing an anionic surfactant at a temperature of 100° C., washed with water and dried, thereby a yellow-dyed fabric was obtained.

The thus-dyed fabric was levelly dyed irrespective of the nature of the fibers at a high color yield. Its fastnesses to light, chlorinated water and washing were good.

Example 32

A dye bath was prepared by adding water to 0.3 part of the disazo compound obtained in Example 1, 0.15 part of Kayacelon Yellow E-3GL, 0.05 part of Kayacelon Yellow E-BRL conc, 60 parts of mirabilite, 2 parts of a condensate of naphthalenesulfonic acid with formalin (a dispersing agent), 3 parts of Mignol RP100 (a special emulsifying agent of Ipposha Oil Industries Co., Ltd.), 2 parts of disodium phosphate and 0.5 part of monopotassium phosphate such that the total volume was 1000 parts. The pH value of this dye bath was 7. 50 Parts of a fabric comprising blended polyester/cotton (50/50) fibers was introduced in the dye bath. After the temperature of the dye bath was increased to 130° C. over 30 minutes, the dyeing was conducted at this temperature for 60 minutes. Then, the fabric was washed with water, soaped in an aqueous solution containing an anionic surfactant at a temperature of 100° C., washed with water and dried, thereby a yellow-dyed fabric was obtained.

The thus-dyed fabric was levelly dyed irrespective of the nature of the fabrics at a high color yield similar to the dyed fabric of Example 31. Its various fastnesses were good.

Example 33

A dye bath was prepared by adding water to 0.5 part of the disazo compound obtained in Example 2, 60 parts of mirabilite, 2 parts of disodium phosphate and 0.5 part of monopotassium phosphate such that the total volume was 1000 parts. The pH value of this dye bath was 7. 50 Parts of a knitted cotton fabric was introduced in the dye bath. After the temperature of the dye bath was increased to 95° C. over 30 minutes, the dyeing was conducted at this temperature for 60 minutes. The pH value of the dye bath after dyeing was 7, the same as that before dyeing. Then, the fabric was washed with water, soaped in an aqueous solution containing an anionic surfactant at a temperature of 100° C., washed with water and dried, thereby a yellow-dyed fabric was obtained.

The thus-dyed fabric was levelly dyed at a high color yield similar to the dyed fabric of Example 30. Its various fastnesses were good.

Example 34

A dye bath was prepared by adding water to 0.5 part of the disazo compound obtained in Example 2, 0.5 part of Kayacelon React Blue CN-MG (reactive dye of Nippon Kayaku Co., Ltd.), 60 parts of mirabilite, 2 parts of disodium phosphate and 0.5 part of monopotassium phosphate such that the total volume was 1000 parts. The pH value of this dye bath was 7. 50 Parts of a knitted cotton fabric was introduced in the dye bath. After the temperature of the dye bath was increased to 95° C. over 30 minutes, the dyeing was conducted at this temperature for 60 minutes. The pH value of the dye bath after dyeing was 7, the same as that before dyeing. Then, the fabric was washed with water, soaped in an aqueous solution containing an anionic surfactant at a temperature of 100° C., washed with water and dried, thereby a green-dyed fabric was obtained.

During the dyeing step, the dyes mixed were compatible each other. A hue of the fabric to be dyed remained similarly and the resultant dyed fabric was levelly dyed without inviting any problem such as color breakup and unlevel dyeing. Dyeing reproducibility was excellent.

Example 35

A dye bath was prepared by adding water to 0.3 part of the disazo compound obtained in Example 1, 0.2 part of Kayanol Milling Yellow 5GW (an acid dye of Nippon Kayaku Co., Ltd.), 0.04 part of Kayanol Milling Yellow RW new (an acid dye of Nippon Kayaku Co., Ltd.), 30 parts of mirabilite, 2 parts of disodium phosphate and 0.5 part of monopotassium phosphate such that the total volume was 1000 parts. The pH value of this dye bath was 7. 50 Parts of a cowoven fabric comprising blended nylon/cotton (50/50) fibers was introduced in the dye bath. After the temperature of the dye bath was increased to 100° C. over 30 minutes, the dyeing was conducted at this temperature for 60 minutes. Then, the fabric was washed with water, soaped in an aqueous solution containing an anionic surfactant at a temperature of 100° C., washed with water and dried, thereby a yellow-dyed fabric was obtained.

The thus-dyed fabric was levelly dyed irrespective of the nature of the fibers at a high color yield.

Example 36

A dye bath was prepared by adding water to the combination and amounts of dyes (compounds) shown in Table 4 (Combination and amounts (in parts) of compounds), 50 parts of anhydrous sodium sulfate and 1 part of Kayaku Buffer P-7 (a pH controlling agent) such that the total volume was 1000 parts. The pH value of this dye bath was 7.2. 50 Parts of a knitted cotton fabric was introduced in the dye bath. After the temperature of the dye bath was increased to 100° C. over 40 minutes, the dyeing was conducted at this temperature for 30 minutes. The pH value of the dye bath remaining after dyeing was 7.0. Then, the fabric was washed with water and hot water successively, soaped in 1000 parts of an aqueous solution containing 1 part of a commercially available soaping agent at a temperature of 100° C. for 10 minutes, washed with water and dried, thereby a brown-dyed fabric was obtained.

In each of Comparative Examples 1 to 3, the dyeing was conducted in the same way as that described in Example 36, provided that the combination and amounts of dyes (compounds) shown in Table 4, was used, thereby a brown-dyed fabric was obtained.

TABLE 4

| | reactive dyes | | | | | |
| --- | --- | --- | --- | --- | --- | --- |
| | yellow | | red | | blue | |
| | formula | amount | formula | amount | formula | amount |
| Ex. 36 | (11) | 0.20 | (7) | 0.10 | (9) | 0.12 |
| | | | | | (10) | 0.08 |
| Comparative Ex. 1 | (24) | 0.20 | (7) | 0.10 | (9) | 0.12 |
| | | | | | (10) | 0.08 |
| Comparative Ex. 2 | (25) | 0.05 | (7) | 0.10 | (9) | 0.12 |
| | (26) | 0.15 | | | (10) | 0.08 |
| Comparative Ex. 3 | (26) | 0.15 | (7) | 0.10 | (9) | 0.12 |
| | (24) | 0.05 | | | (10) | 0.08 |

The compounds which in free acid forms are represented by the formulae (24), (25) and (26), respectively used in Comparative Examples 1 to 3 are shown below.

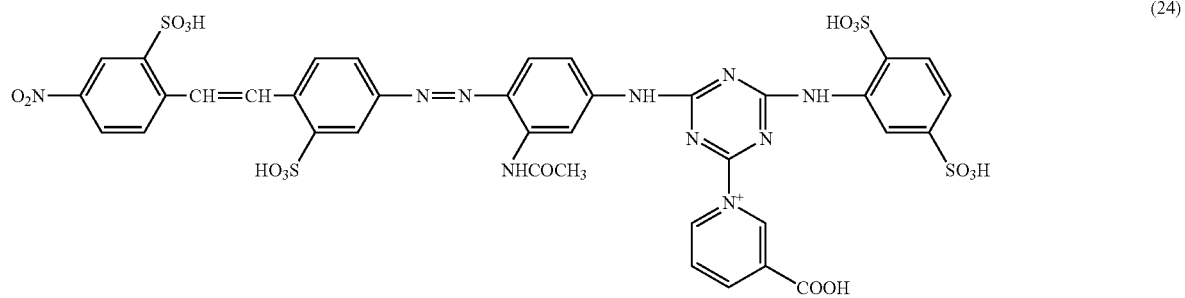

(24)

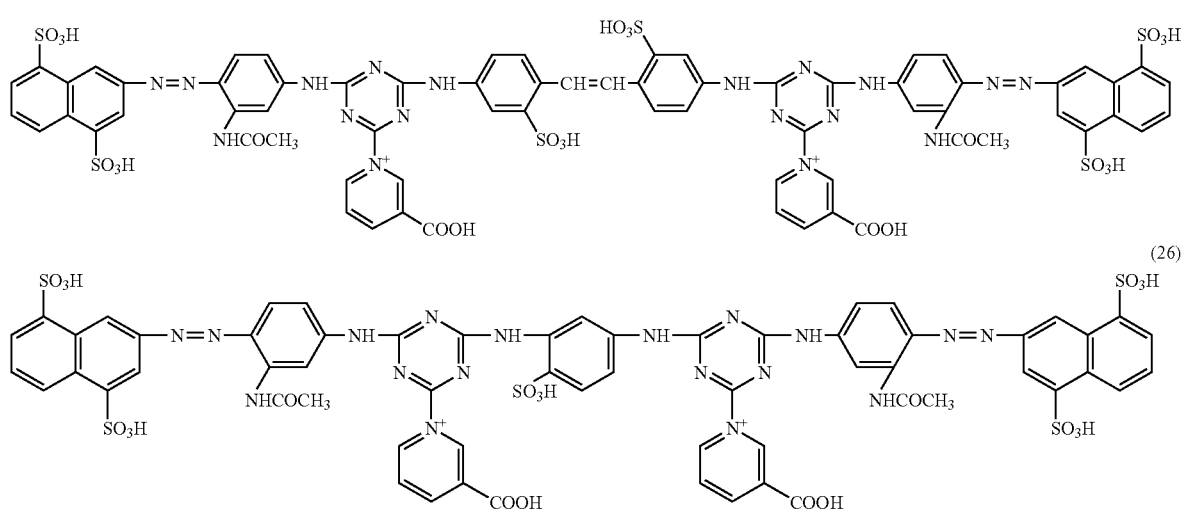

(25)

(26)

Next, methods for testing and judging dependency on dyeing conditions, fixing efficiency and washing property will be described below.

Dependency on Dyeing Conditions

[Salt Concentration]

The dyeing was conducted in the same way as that described in Example 36 except that 25 parts of anhydrous sodium sulfate was used instead of 50 parts of anhydrous sodium sulfate.

Method of judgment: The difference in hue between the fabric dyed with 50 parts of anhydrous sodium sulfate and the fabric dyed with 25 parts of anhydrous sodium sulfate was judged by the naked eye.
○ small hue difference
Δ medium hue difference
× significant hue difference

[pH]

The dyeing was conducted in the same way as that described in Example 36 except that 1 part of a mixture of boric acid and borax (7:3) was used instead of 1 part of Kayaku Buffer P-7 (a pH controlling agent). The pH value of the dye bath was 8.3. The pH value of the dye bath remaining after dyeing was 8.0.

Method of judgment: The difference in hue between the fabric dyed in a dye bath of pH 7 and the fabric dyed in a dye bath of pH 8 was judged by the naked eye.

○ small hue difference
Δ medium hue difference
× significant hue difference

[Temperature]

The dyeing was conducted in the same way as that described in Example 36 except that the dyeing temperature of 95° C. was used instead of the dyeing temperature of 100° C.

Method of judgment: The difference in hue between the fabric dyed at the temperature of 100° C. and the fabric dyed at the temperature of 95° C. was judged by the naked eye.
○ small hue difference
Δ medium hue difference
× significant hue difference Fixing Efficiency The dyeing was started in the same way as that described in Example 36. After the dyeing was conducted at a temperature of 100° C. for 30 minutes, the thus-dyed fabric was taken out, immediately dehydrated and dried, thereby a non-washed fabric was obtained.

Method of judgment: The difference in hue between the above non-washed fabric and the dyed fabric after washing obtained in Example 36 was judged by the naked eye. The fixing efficiency means a ratio of (a fixed dye)/the total of (a fixed dye and a non-fixed dye) on a dyed fabric.
○ hue difference is small and lowering in concentration is minor; It indicates that fixing efficiency of each of yellow, red and blue reactive dyes is high.

× blue hue is strong and lowering in concentration is significant; It indicates that fixing efficiency of a yellow reactive dye is low. When a fixing efficiency of certain hue component is lower in a mixed dyeing, a reproducibility upon dyeing becomes poor.

Washing Property

The dyeing was started in the same way as that described in Example 36. After the dyeing was conducted at a temperature of 100° C. for 30 minutes, the thus-dyed fabric was taken out, washed with water, soaped in 1000 parts of an aqueous solution containing 1 part of a commercially available soaping agent at 95° C. for 10 minutes and then washed with water, thereby a dyed fabric was obtained. Immediately the dyed fabric under a wet condition was folded in four. A cotton broadcloth (white cloth) was put on an uppermost of the folded fabric and ironed at 130° C. for three minutes so that the fabric and the cloth were subjected to heat treatment under pressure.

Method of judgment: The degree of color transfer of a non-fixed dye to a cotton broadcloth (white cloth) by this heat treatment was judged by the naked eye.

○ Color transfer of an on-fixed dye to a white cloth is minor. The color similar to that of the dyed fabric is transferred.

× Color transfer of a non-fixed dye, especially a yellow dye is significant. When a washing property is poor and a color transfer of a non-fixed dye during a drying step of a dyed fabric is significant, levelness or fastnesses become worse.

Dependency on dyeing conditions, fixing efficiency and washing property of Example 36 and Comparative Examples 1 to 3 were compared. Results are shown in Table 5.

TABLE 5

|  | dependency on dyeing condition | | | fixing efficiency | washing property |
|---|---|---|---|---|---|
|  | salt concentration | pH | temperature | | |
| Ex. 36 | ○ | ○ | ○ | ○ | ○ |
| Comparative Ex. 1 | Δ | X | Δ | X | X |
| Comparative Ex. 2 | ○ | X | X | X | X |
| Comparative Ex. 3 | ○ | X | Δ | X | X |

Only in the case of using the combination of compounds for dyeing as shown in Example 36, each dye component of yellow, red and blue reactive dyes showed the same dyeing property. Even if the dyeing conditions such as salt concentration, pH of a dye bath, dyeing temperature and the like were varied, a change in hue was minor, a fixing efficiency was high and a dyeing reproducibility was also excellent. Further, a color transfer of a non-fixed dye was not observed and a washing property was excellent. In addition, the dyeing rates of dye components agreed well with each other and therefore a very level dyeing was attained.

Examples 37 to 46

The dyeing was conducted in the same way as that described in Example 36 except that the combination and amounts of compounds as shown in Table 6 was used.

TABLE 6

|  | reactive dyes | | | | | |
|---|---|---|---|---|---|---|
|  | yellow | | red | | blue | |
|  | formula | amount | formula | amount | formula | amount |
| Ex. 37 | (27) | 0.20 | (7) | 0.10 | (9) | 0.12 |
|  |  |  |  |  | (10) | 0.08 |
| Ex. 38 | (11) | 0.16 | (7) | 0.10 | (9) | 0.12 |
|  | (25) | 0.04 |  |  | (10) | 0.08 |
| Ex. 39 | (11) | 0.16 | (7) | 0.10 | (9) | 0.12 |
|  | (26) | 0.04 |  |  | (10) | 0.08 |
| Ex. 40 | (11) | 0.20 | (8) | 0.10 | (9) | 0.12 |
|  |  |  |  |  | (10) | 0.08 |
| Ex. 41 | (11) | 0.20 | (7) | 0.05 | (9) | 0.12 |
|  |  |  | (8) | 0.05 | (10) | 0.08 |
| Ex. 42 | (11) | 0.20 | (7) | 0.07 | (9) | 0.12 |
|  |  |  | (19) | 0.03 | (10) | 0.08 |
| Ex. 43 | (11) | 0.20 | (7) | 0.10 | (9) | 0.02 |
| Ex. 44 | (11) | 0.02 | (7) | 0.02 | (10) | 2.00 |
| Ex. 45 | (11) | 1.00 | (7) | 1.00 | — | — |
| Ex. 46 | (11) | 0.50 | — | — | (9) | 0.30 |
|  |  |  |  |  | (10) | 0.20 |

The compound which in a free acid form is represented by the formula (27) used in Example 37 is shown below.

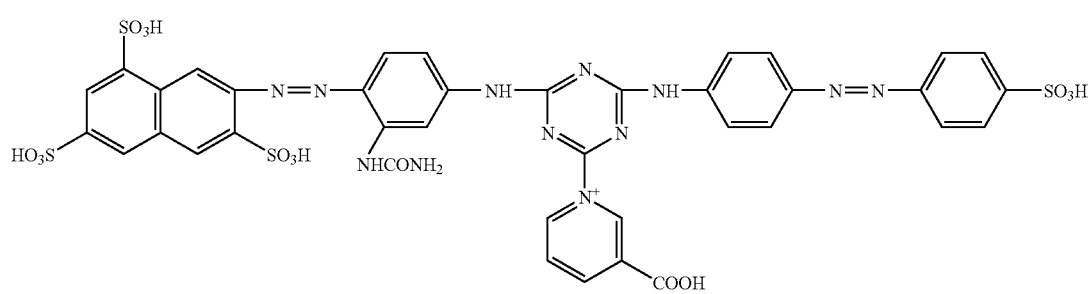

(27)

The hue of the resultant dyed fabric in Examples 37 to 46 was a dark pink color (Example 43), a navy blue color (Example 44), a scarlet red color (Example 45), a green color (Example 46) or a brown color (other examples).

In either of the combinations of Examples 37 to 46, the dyeing rates of dye components during a dyeing step agreed well with each other, a fixing efficiency was high and a washing property was excellent. Further, each of the resultant dyed fabrics was excellent in levelness and various fastnesses such as a fastness to light, a fastness to light with perspiration, a fastness to chlorinated water and the like.

Examples 47 to 50

A dye bath was prepared by adding water to the combination and amounts of dyes (compounds) shown in Table 7, 50 parts of anhydrous sodium sulfate and 1 part of Kayaslide PH-509 (a pH sliding agent of Nippon Kayaku Co., Ltd.) such that the total volume was 1000 parts. The pH value of this dye bath was 5.2. 50 Parts of a knitted cotton fabric was introduced in the dye bath. After the temperature of the dye bath was increased to 95° C. over 40 minutes, the dyeing was conducted at this temperature for 30 minutes. The pH value of the dye bath remaining after dyeing was 8.7. Then, the fabric was washed with water and hot water successively, soaped in 1000 parts of an aqueous solution containing 1 part of a commercially available soaping agent at a temperature of 100° C. for 10 minutes, washed with water and dried, thereby a dyed fabric was obtained.

Examples 51 to 54

A dye bath was prepared by adding water to the combination and amounts of dyes (compounds) shown in Table 7, 50 parts of anhydrous sodium sulfate and 1 part of Kayaku Buffer P-7 (a pH controlling agent of Nippon Kayaku Co., Ltd.) such that the total volume was 1000 parts. The pH value of this dye bath was 7.2. 50 Parts of a knitted cotton fabric was introduced in the dye bath. After the temperature of the dye bath was increased to 120° C. over 40 minutes, the dyeing was conducted at this temperature for 30 minutes. The pH value of the dye bath remaining after dyeing was 6.9. Then, the fabric was washed with water and hot water successively, soaped in 1000 parts of an aqueous solution containing 1 part of a commercially available soaping agent at a temperature of 100° C. for 10 minutes, washed with water and dried, thereby a dyed fabric was obtained.

TABLE 7

| | reactive dyes | | | | | |
|---|---|---|---|---|---|---|
| | yellow | | red | | blue | |
| | formula | amount | formula | amount | formula | amount |
| Ex. 47 | (11) | 0.18 | (7) | 0.12 | (9) | 0.11 |
| | | | | | (10) | 0.08 |
| Ex. 48 | (11) | 0.20 | (8) | 0.12 | (9) | 0.11 |
| | | | | | (10) | 0.08 |
| Ex. 49 | (11) | 1.10 | (7) | 0.90 | — | — |
| Ex. 50 | (11) | 0.55 | — | — | (9) | 0.30 |
| | | | | | (10) | 0.20 |
| Ex. 51 | (11) | 0.18 | (7) | 0.12 | (9) | 0.11 |
| | | | | | (10) | 0.08 |

TABLE 7-continued

| | reactive dyes | | | | | |
|---|---|---|---|---|---|---|
| | yellow | | red | | blue | |
| | formula | amount | formula | amount | formula | amount |
| Ex. 52 | (11) | 0.20 | (8) | 0.12 | (9) | 0.11 |
| | | | | | (10) | 0.08 |
| Ex. 53 | (11) | 1.10 | (7) | 0.90 | — | — |
| Ex. 54 | (11) | 0.55 | — | — | (9) | 0.30 |
| | | | | | (10) | 0.20 |

The hue of the resultant dyed fabric in Examples 47 to 50 was a brown color (Examples 47 and 48), a scarlet red color (Example 49) and a green color (Example 50). In either of the combinations of Examples 47 to 50, the dyeing rates of dye components during a dyeing step agreed well with each other, a fixing efficiency was high and a washing property was also excellent. Further, each of the resultant dyed fabrics was excellent in levelness and various fastnesses such as a fastness to light, a fastness to light with perspiration, a fastness to chlorinated water and the like.

The hue of the resultant dyed fabric in Examples 51 to 54 was a brown color (Examples 51 and 52), a scarlet red color (Example 53) and a green color (Example 54). In either of the combinations of Examples 51 to 54, the dyeing rates of dye components during a dyeing step agreed well with each other, a fixing efficiency was high and a washing property was also excellent. And, each of the resultant dyed fabrics was excellent in levelness and various fastnesses such as a fastness to light, a fastness to light with perspiration, a fastness to chlorinated water and the like.

Example 55

A dye bath was prepared by adding water to the combination and amounts of dyes (compounds) shown in Table 8, 50 parts of anhydrous sodium sulfate and 1 part of Kayaku Buffer P-7 (a pH controlling agent of Nippon Kayaku Co., Ltd.) such that the total volume was 1000 parts. The pH value of this dye bath was 7.2. 50 Parts of a cowoven fabric comprising blended cotton/rayon (50%/50%) fibers was introduced in the dye bath. After the temperature of the dye bath was increased to 100° C. over 40 minutes, the dyeing was conducted at this temperature for 30 minutes. The pH value of the dye bath remaining after dyeing was 7.0. Then, the fabric was washed with water and hot water successively, soaped in 1000 parts of an aqueous solution containing 1 part of a commercially available soaping agent at a temperature of 100° C. for 10 minutes, washed with water and dried, thereby a dyed fabric was obtained.

In Comparative Examples 4 and 5, the dyeing was conducted in the same way as that described in Example 55 except that the combination and amounts of dyes (compounds) shown in Table 8, was used, thereby a dyed fabric was obtained.

TABLE 8

| | reactive dyes | | | | | |
|---|---|---|---|---|---|---|
| | yellow | | red | | blue | |
| | formula | amount | formula | amount | formula | amount |
| Ex. 55 | (11) | 0.20 | (7) | 0.15 | (9) | 0.12 |
| | | | | | (10) | 0.08 |
| Comparative Ex. 4 | (25) | 0.05 | (7) | 0.15 | (9) | 0.12 |
| | (26) | 0.15 | | | (10) | 0.08 |
| Comparative Ex. 5 | (26) | 0.15 | (7) | 0.15 | (9) | 0.12 |
| | (24) | 0.05 | | | (10) | 0.08 |

Solid Dyeing Property of Cotton/Rayon Fibers

Method of judgment: A solid dyeing of cotton/rayon fibers dyed in one bath dyeing method was judged by the naked eye.
○ excellent solid dyeing
× inferior solid dyeing Hues of cotton and rayon fibers in the resultant dyed fabric and a solid dyeing property of Example 55 and Comparative Examples 4 and 5 are shown in Table 9.

TABLE 9

| | hue | | solid dyeing |
|---|---|---|---|
| | cotton fibers | rayon fibers | property |
| Ex. 55 | brown | brown | ○ |
| Comparative Ex. 4 | brown | purple - violet | X |
| Comparative Ex. 5 | brown | purple - violet | X |

Only in the case of using the combination of compounds for dyeing as shown in Example 55, each dye component of yellow, red and blue reactive dyes showed the same dyeing property on rayon fibers. In this case, a solid dyeing property of cotton and rayon fibers dyed in one bath dying method was very excellent. Thus, the reactive dye composition of the present invention is very effective in solid dyeing of blended cotton/rayon fibers and a cowoven fabric thereof.

Example 56

A dye bath was prepared by adding water to 0.4 part of the compound of the formula (11), 0.1 part of the compound of the formula (7), 0.07 part of the compound of the formula (9), 0.05 part of the compound of the formula (10), 0.22 part of Kayalon Microester Yellow AQ-LE (trade name of Nippon Kayaku Co., Ltd., a disperse dye for polyester fibers), 0.15 part of Kayalon Microester Red AQ-Le (trade name of Nippon Kayaku Co., Ltd., a disperse dye for polyester fibers), 0.05 part of Kayalon Microester Blue AQ-LE (trade name of Nippon Kayaku Co., Ltd., a disperse dye for polyester fibers), 60 parts of anhydrous sodium sulfate and 1 part of Kayaku Buffer P-7 (a pH controlling agent of Nippon Kayaku Co., Ltd.) such that the total volume was 1000 parts. The pH value of this dye bath was 7.2. 50 Parts of a fabric comprising blended cotton/polyester fibers were introduced in the dye bath. After the temperature of the dye bath was increased to 130° C. over 40 minutes, the dyeing was conducted at this temperature for 40 minutes. The pH value of the dye bath remaining after dyeing was 6.9. Then, the fabric was washed with water and hot water successively, soaped in 1000 parts of an aqueous solution containing 1 part of a commercially available soaping agent at a temperature of 100° C. for 10 minutes, washed with water and dried, thereby a yellowish brown-dyed fabric was obtained.

When the dye composition of Example 56 was used, a washing property during a washing step was excellent. The resultant dyed fabric was levelly dyed irrespective of the nature of fibers. Various fastnesses such as a fastness to light, a fastness to light with perspiration, a fastness to washing and the like were also excellent.

Example 57

A dye bath was prepared by adding water to 1 part of the compound of the formula (11), 0.35 part of the compound of the formula (7), 0.16 part of the compound of the formula (9), 0.11 part of the compound of the formula (10), 0.3 part of Kayanol Yellow NFG (trade name of Nippon Kayaku Co., Ltd., an acid dye for nylon fibers), 0.16 part of Kayanol Floxine NK (trade name of Nippon Kayaku Co., Ltd., an acid dye for nylon fibers), 0.09 part of Kayanol Blue N2G (trade name of Nippon Kayaku Co., Ltd., an acid dye for nylon fibers), 60 parts of anhydrous sodium sulfate and 1 part of Kayaku Buffer P-7 (a pH controlling agent of Nippon Kayaku Co., Ltd.) such that the total volume was 1000 parts. The pH value of this dye bath was 7.3. 50 Parts of a fabric comprising blended cotton/nylon fibers was introduced in the dye bath. After the temperature of the dye bath was increased to 100° C. over 40 minutes, the dyeing was conducted at this temperature for 40 minutes. The pH value of the dye bath remaining after dyeing was 7.1. Then, the fabric was washed with water and hot water successively, soaped in 1000 parts of an aqueous solution containing part of a commercially available soaping agent at a temperature of 80° C. for 10 minutes, washed with water and dried, thereby a brown-dyed fabric was obtained.

When the dye composition of Example 57 was used, a washing property during a washing step was excellent. The resultant dyed fabric was levelly dyed irrespective of the nature of fibers. A fastness to light and a fastness to light with perspiration were excellent.

Example 58

The compound of the formula (11) as a yellow reactive dye, the compound of the formula (7) as a red reactive dye and the compounds of formulae (9) and (10) as blue reactive dyes were mixed in a ratio of 50%: 25%: 15%: 10% to obtain a reactive dye composition of the present invention. The dyeing was conducted in the same way as that described in Example 36 using 0.5 part of this reactive dye composition, thereby a brown-dyed fabric was obtained.

When the reactive dye composition of Example 58 was used, the dyeing rates of dye components during a dyeing step agreed well with each other. A fixing efficiency was high and a washing property was also excellent. The resultant dyed fabric was levelly dyed and excellent in fastnesses such as a fastness to light, a fastness to light with perspiration, a fastness to chlorinated water and the like.

EFFECT OF THE INVENTION

When cellulosic fibers are dyed with the disazo compound of the present invention, the dyeing with a high color yield, excellent fastnesses in various aspects, good thermal discoloring and good phototropy can be conducted with good levelness and reproducibility. Further, cellulosic fibers can be dyed with excellent reproducibility by an efficient all-in-one method.

A fabric comprising blended polyester/cotton fibers can be dyed in the co-existence of a disperse dye by a reasonable one bath/one step method.

In addition, cellulose or cellulose-containing fibers can be efficiently dyed with excellent washing property, excellent reproducibility, good levelness and high fastnesses, by using the reactive dye composition of the present invention.

What is claimed is:

1. A disazo compound which in a free acid form is represented by the following general formula (1):

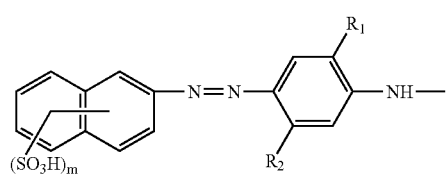

(1)

-continued

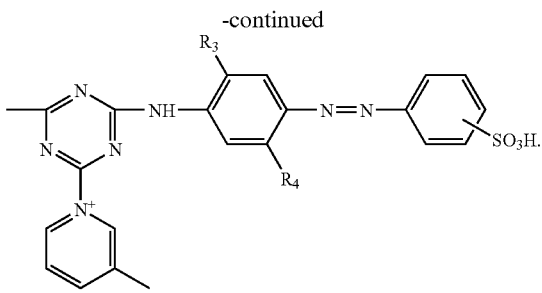

wherein $R_1$ is hydrogen atom or methoxy group; $R_2$ is hydrogen atom, methyl group, methoxy group, acetylamino group or ureido group; $R_3$ is hydrogen atom or methoxy group; $R_4$ is hydrogen atom, methyl group, acetylamino group or ureido group; and m is 2 or 3.

2. A method of dyeing cellulosic fibers comprising applying to said fibers the disazo compound as defined in claim 1.

3. A reactive dye composition comprising
   (A) a yellow reactive dye which comprises at least one compound selected from the group consisting of compounds which in free acid forms are represented by the general formula (1) as defined in claim 1, together with
   (B) a red reactive dye which comprises at least one compound selected from the group consisting of azo compounds which in free acid forms are represented by the following general formula (2):

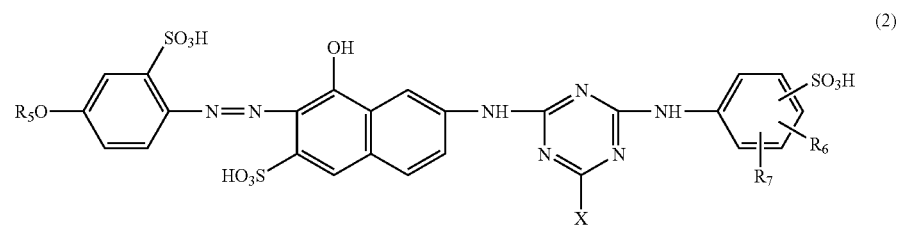

(2)

wherein $R_5$ is $CH_3$ or $C_2H_5$; $R_6$ and $R_7$ are independently H, Cl or $CH_3$; and X is

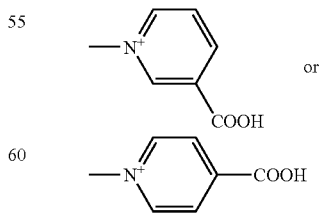

and azo compounds which in free acid forms are represented by the following general formula (3):

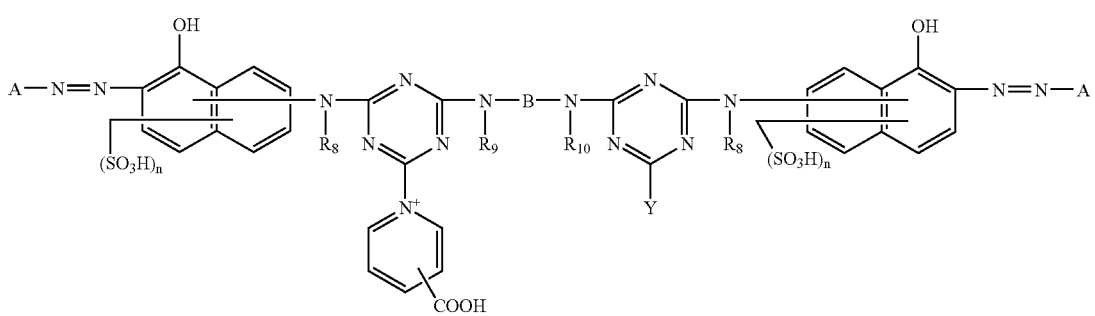

(3)

wherein A is a benzene nucleus having 1 to 2 sulfonic acid group or carboxyl group and optionally methyl group, methoxy group or chlorine atom, or a naphthalene nucleus having 1 to 3 sulfonic acid groups; $R_8$, $R_9$ and $R_{10}$ are independently hydrogen atom or methyl group; n is 1 or 2; Y is

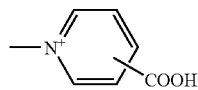

or chlorine atom; and B is —$(CH_2)_p$— in which p is 2 or 3, —$C_2H_4OC_2H_4$—, —$CH_2CH(OH)CH_2$—,

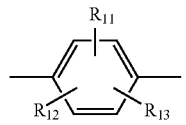

in which $R_{11}$, $R_{12}$ and $R_{13}$ are independently hydrogen atom, methyl group, sulfonic acid group or carboxyl group, provided that this formula does not represent

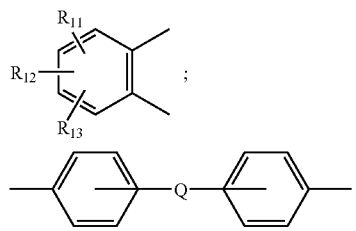

in which Q is O, $SO_2$, NHCO or NH,

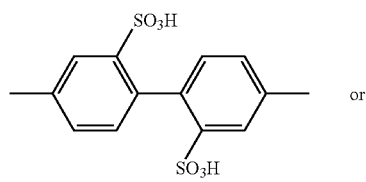

or

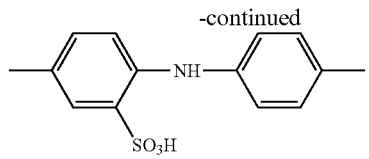

and/or (C) a blue reactive dye which comprises at least one compound selected from the group consisting of formazane compounds which in free acid forms are represented by the following general formula (4):

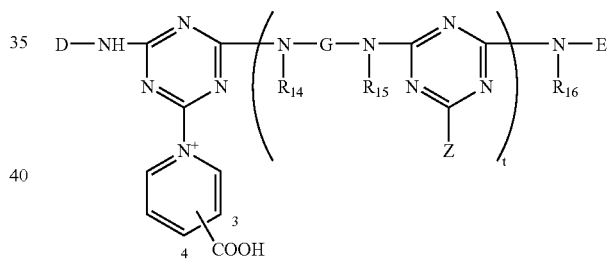

(4)

wherein D is a group of a formazane compound represented by the following general formula (5):

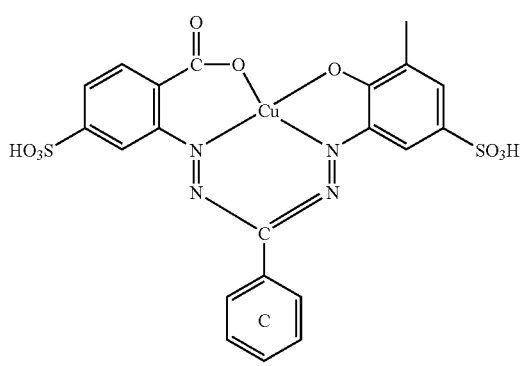

(5)

in which the benzene nucleus c may have sulfonic acid group or chlorine atom; t is 0 or 1; when t is 0, $R_{16}$ is hydrogen atom, E is the above-defined D or phenyl group substituted with methyl, methoxy, sulfonic acid group or chlorine and when t is 1, $R_{14}$ and $R_{15}$ each is hydrogen atom or methyl group; G is —$C_2H_4$—, —$C_2H_4OC_2H_4$—, phenylene group optionally substituted with methyl, sulfonic acid group, carboxyl or chlorine,

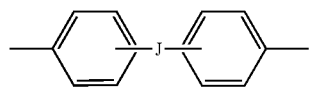

in which J is O, $SO_2$, NH and NHCO,

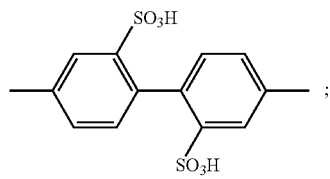

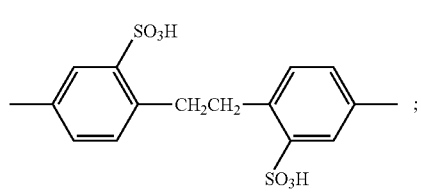

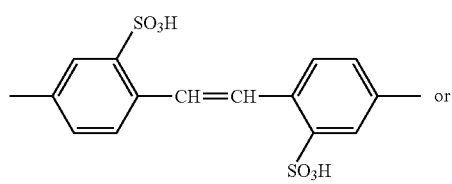 or

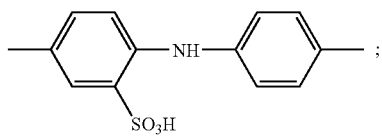

Z is chlorine atom or

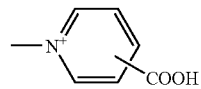

in which carboxyl group is bonded to 3 or 4 position; E is the above-defined D; $C_{1-2}$ alkyl group; or phenyl group optionally substituted with methoxy, sulfonic acid group or carboxyl, and $R_{16}$ is hydrogen atom and alternatively $R_{16}$ together with E form

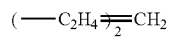

provided that when E is D, $R_{16}$ is hydrogen atom and when G is

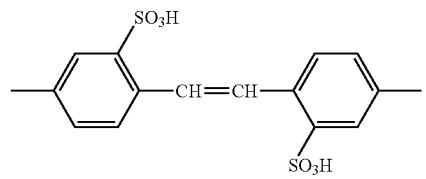

E is not D,
and disazo compounds which in free acid forms are represented by the following general formula (6):

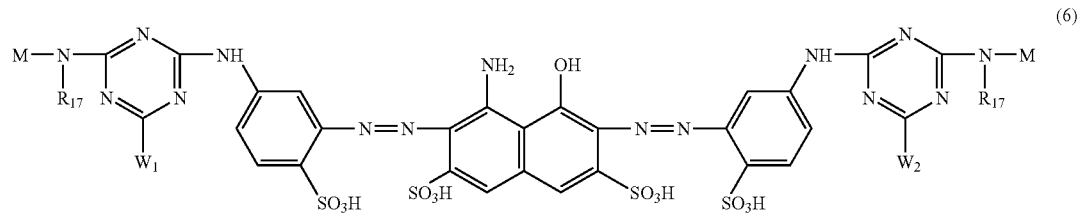

(6)

wherein M is phenyl group optionally substituted with sulfonic acid group, carboxyl, methyl, methoxy or chlorine, naphthyl group substituted with 1 to 3 sulfonic acid group, $C_{1-3}$ alkyl group optionally substituted with carboxyl or sulfonic acid group, or hydrogen atom; $R_{17}$ is hydrogen atom or methyl group; $W_1$ and $W_2$ are independently chlorine atom or

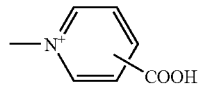

in which carboxyl group is bonded to 3 or 4 position, provided that at least one of $W_1$ and $W_2$ is

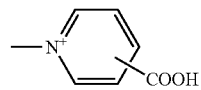

in which carboxyl group binds to 3 or 4 position.

4. A reactive dye composition comprising
   (A) a yellow reactive dye which comprises at least one compound selected from the group consisting of compounds which in free acid forms are represented by the general formula (1) as defined in claim 1, together with
   (B) a red reactive dye comprising a compound represented by the following formulae (7) and/or (8):

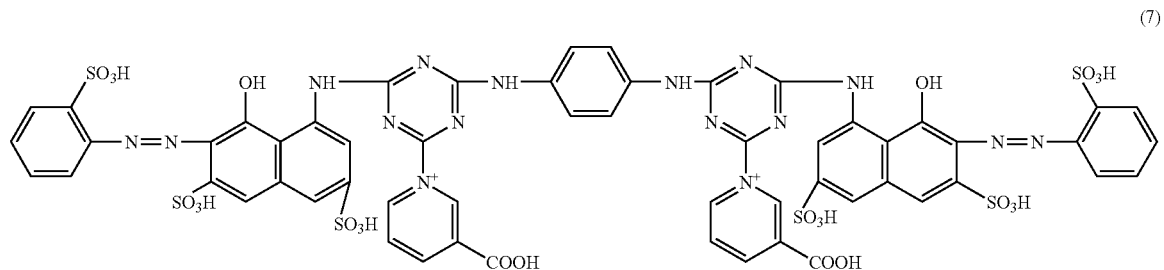

(7)

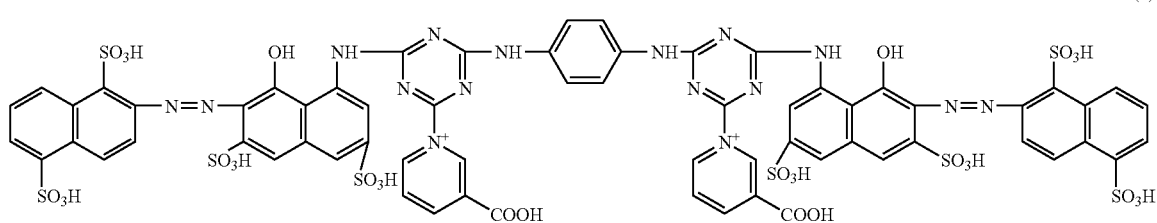

(8)

and a mixture of a blue reactive dye (C) comprising compounds represented by the following formulae (9) and (10):

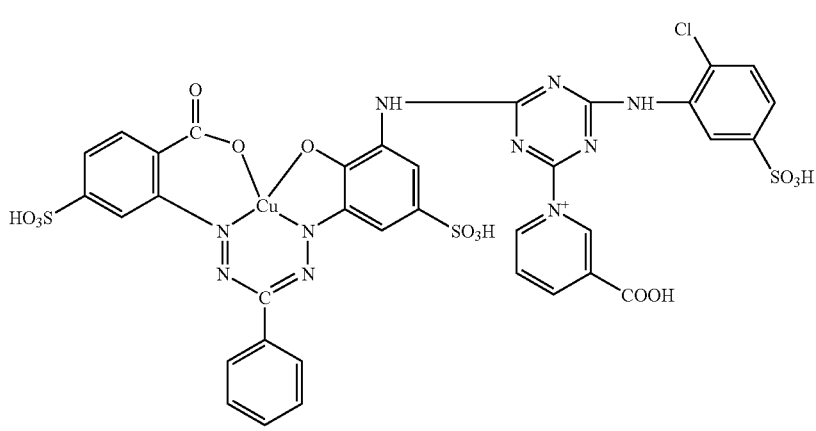

(9)

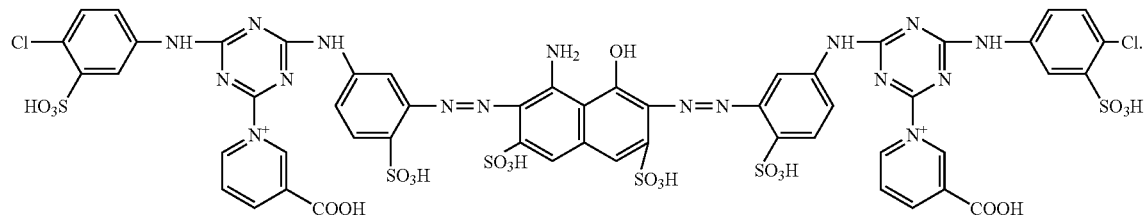

5. A reactive dye composition as claimed in claim 4 wherein the yellow reactive dye (A) comprises a compound represented by the formula (11):

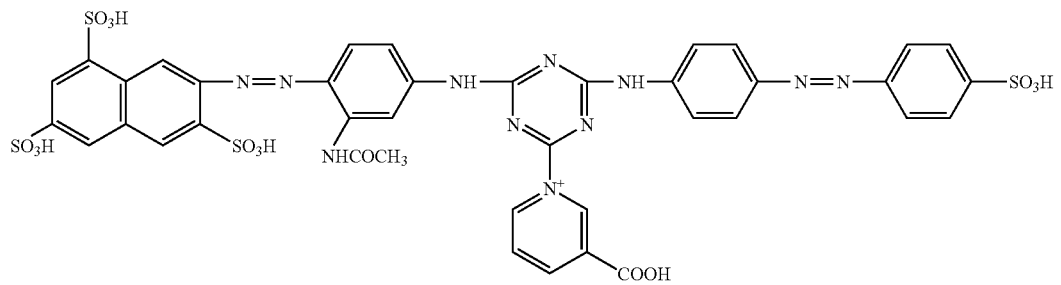

and the mixing ratio of the compounds represented by the above formulae (9) and (10) in the blue reactive dye (C) is 50 to 70:50 to 30.

6. A method of dyeing cellulose or cellulose-containing fibers comprising applying to said fibers the reactive dye composition as defined in claim 3, 4 or 5.

7. A method of dyeing cellulose or cellulose-containing fibers as defined in claim 6 wherein the application of said dye composition is in a dye bath having a pH of 5 to 9 and a dyeing temperature is 90 to 140° C.

8. A method of dyeing cellulose or cellulose-containing fibers as defined in claim 7 wherein the dyeing temperature is 95 to 110° C.